United States Patent [19]

Toba

[11] Patent Number: 4,800,447
[45] Date of Patent: Jan. 24, 1989

[54] SLOW-PLAYBACK FOR HELICAL SCANNING TYPE VCR-VTR

[75] Inventor: Akira Toba, Fukaya, Japan

[73] Assignee: Kabushiki Kaisha Toshiba, Kawasaki, Japan

[21] Appl. No.: 911,094

[22] Filed: Sep. 24, 1986

[30] Foreign Application Priority Data

Sep. 27, 1985 [JP] Japan .................. 60-212130

[51] Int. Cl.$^4$ .............................................. H04N 5/78
[52] U.S. Cl. ................................ 360/10.3; 360/10.2; 360/33.1; 358/312; 358/338
[58] Field of Search ...................... 360/10.1–10.3, 360/33.1, 77; 358/312, 335, 338

[56] References Cited

U.S. PATENT DOCUMENTS

| 4,558,376 | 12/1985 | Heitmann | 360/10.1 |
| 4,558,377 | 12/1985 | Collins et al. | 360/10.1 |
| 4,575,772 | 3/1986 | Shimada et al. | 360/33.1 |
| 4,635,134 | 1/1987 | Sasamura et al. | 360/10.3 |
| 4,644,412 | 2/1987 | Nishimoto et al. | 358/335 |
| 4,644,415 | 2/1987 | Serizawa et al. | 360/10.3 |
| 4,682,247 | 7/1987 | Doutsbo | 360/10.2 |

OTHER PUBLICATIONS

Kobori et al, "One Chip Servo System LSI for Home VCR", IEEE Transactions on Consumer Electronics, vol. CE-27, Feb. 1981, pp. 71-81.
Rundfunktechnische Mitteilungen, vol. 12, (1968), Issue No. 6, pp. 249-258.
Journal of the Institute of Televisions vol. 35, No. 8 (1981), "B-format VTR and its Application" Y. Soh-mat (transliterated), This document discloses a slow reproduction using a digital memory.

Primary Examiner—Aristotelis M. Psitos
Attorney, Agent, or Firm—Cushman, Darby & Cushman

[57] ABSTRACT

In a special playback apparatus for a VTR, an address clear signal for setting a write start timing of the video data is derived from a reference signal of a servo circuit in a video tape recorder. In order to obtain a slow playback image of 1/M times (where M is a natural number), a signal serving as a reference signal for capstan servo in the playback mode is divided at a frequency division ratio of 1/M to prepare a slow playback reference signal. The memory write operation is started upon generation of N address clear signals (i.e., at the Nth clear signal) after generation of the 1/M frequency-divided signal according to the value of M, thus providing a special playback apparatus for a VTR. The apparatus is capable of writing in a memory a playback image signal whose playback RF signal has a maximum amplitude.

21 Claims, 6 Drawing Sheets

SLOW-PLAYBACK FOR HELICAL SCANNING TYPE VCR-VTR

BACKGROUND OF THE INVENTION

The present invention relates to a special playback apparatus for a video tape recorder (to be referred to as a VTR hereinafter) and, more particularly, to a special playback apparatus using an image memory.

Apparatuses for performing special playback such as slow playback and still playback are built into conventional home VTRs. Various types of conventional special playback apparatuses have been all proposed based on a design concept for improving visualization on a screen. Improvements are concentrated on field still playback for obtaining a still image without blurring (vertical vibrations on the screen) by using a special playback head, intermittent slow playback for a slow image without noise by intermittently driving a magnetic tape, high-speed playback with little noise by using a double azimuth- head, and dynamic tracking for shifting a head position on a rotary head drum so as to cause the head to accurately trace video tracks.

Two rotary video heads having different azimuth angles are alternately used in a home VTR to record video signals so as to helically form video tracks on a magnetic tape. For this reason, if video signals are reproduced while the tape is driven at a speed different from that in the recording mode, the video head does not accurately trace the tracks and the playback signal level is greatly reduced at some tape portions, thus generating noise on the screen at timings corresponding to these portions. Conventional proposals have been made to eliminate such a reduction in playback signal level. In other words, such proposals were made to allow the video head to accurately trace video tracks and to prevent the playback signal from level reduction. However, associated techniques have reached a satisfactory level.

A future development in this field is likely to aim at not controlling the relationship between the video tracks and the video head, but processing a playback signal to reduce noise.

For this purpose, a special playback apparatus with an image memory can be proposed. A noise free component of the playback video signal is extracted, and the extracted component is written in a field memory. The stored data is then read out from the field memory to obtain a special playback image free-from noise. This technique neither uses a special head nor a means for intermittently driving the magnetic tape, and allows a simple arrangement for special reproduction. In addition, since the cost of a newly required semiconductor image memory is greatly reduced hyperbolically, special playback apparatuses with semiconductor memories are expected to be popular in a future market since the operation is stable and an associated mechanism is simple.

However, in a special playback apparatus with a semiconductor field memory, it is important to determine how a noise free field signal is extracted from the playback video signal and what timing is required for writing the extracted signal in a memory.

If a tape speed in the playback mode is set to be 1/M that in the recording mode, an optimal field for obtaining a playback video signal having substantially the same level as that in the normal playback mode throughout the entire period is present once in 2M (where M is an integer of 2 or more) fields. If M=1, it indicates the normal playback mode. If M is a negative integer, the tape travel direction in the playback mode is reversed from that in the recording mode. The optimal field is searched by a given method. The playback signal of the optimal field is converted into a digital signal, and the digital signal is written in a memory. The signal written in the memory is continuously read out until the next optimal field which represents a maximum level of the playback video signal appears. Therefore, a continuous digital video signal whose content is updated for every 2M fields is obtained. The digital video signal is converted into an analog video signal, and the analog video signal is supplied to a television receiver or monitor TV to obtain a noise free image. In this case, it is extremely important to write data in the memory at specific timings for every 2M fields. The data write timings are also related to tracking control. For example, if a signal in a field period after the lapse of a predetermined period of time upon playback of a control signal is written in a memory, a field (noiseless field) for obtaining a maximum video level at a given tape speed does not always serve as a noiseless field for obtaining a maximum video level at another tape speed since the tracking states differ from each other.

For this reason, demand has arisen for developing a technique for selecting a noiseless field (derived from the playback video signal) constantly having a maximum level at any tape speed.

SUMMARY OF THE INVENTION

The present invention has been made in consideration of the above situation, and has as its object to provide a special playback apparatus for a VTR, wherein a playback video signal whose field period includes a playback RF signal with a maximum amplitude can be written in an image memory.

In order to achieve the above object of the present invention, an address clear signal (Ref2) for setting a write start timing of the video data is derived from a reference signal (Ref1) of a servo circuit in a video tape recorder. In order to obtain a slow playback image of speed 1/M (where M is a natural number), a signal (Ref2) serving as a reference signal for capstan servo in the playback mode is divided at a frequency division ratio of 1/M to prepare a slow playback reference signal (Ref3). The memory write operation is started upon generation of N address clear signals (Ref2) (i.e., at the Nth clear signal) after generation of the 1/M frequency-divided signal (Ref3) according to the value of M.

DETAILED DESCRIPTION OF THE PREFERRED EMBODIMENT

The present invention will be described in detail with reference to the accompanying drawings.

Figure 1:
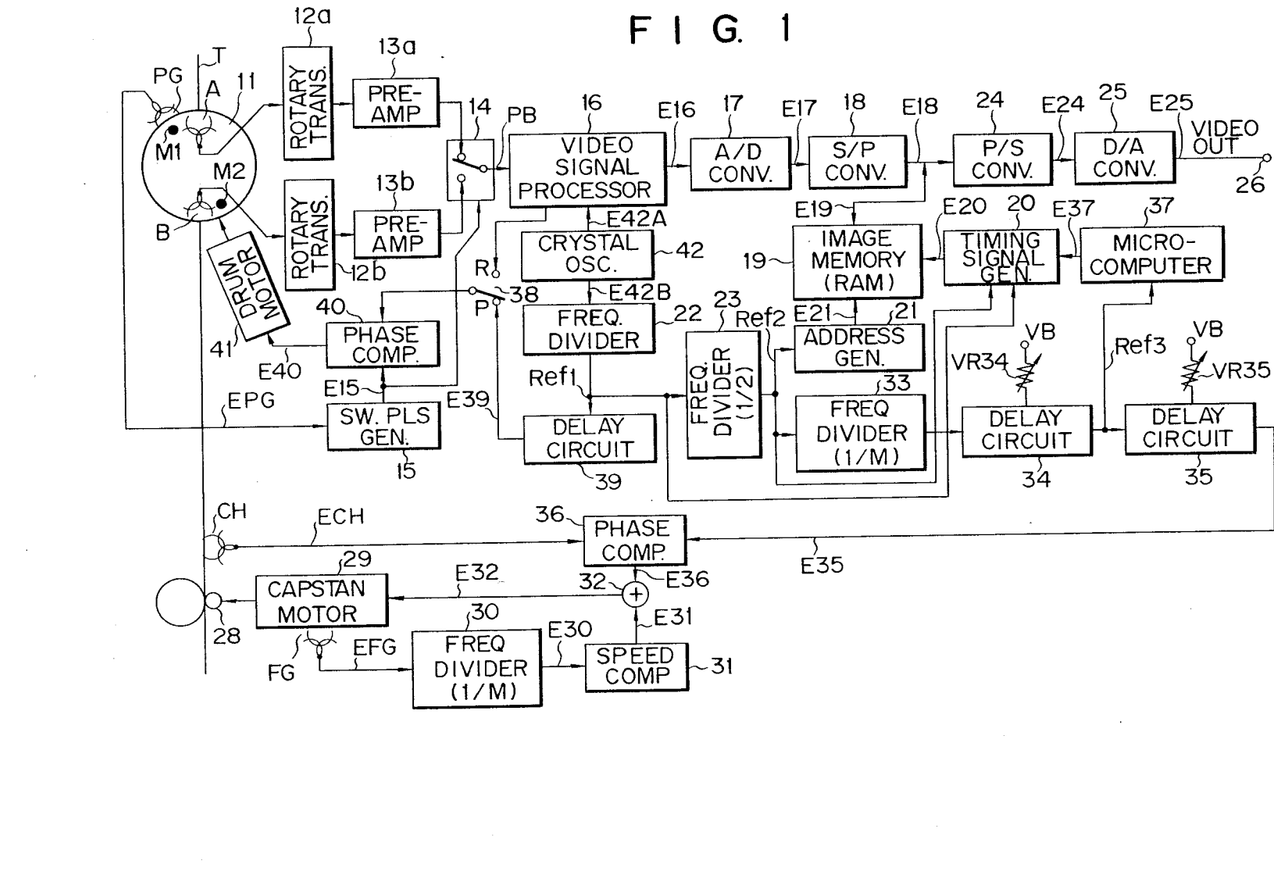
FIG. 1 is a block diagram showing a VTR including a special playback apparatus according to an embodiment of the present invention.

FIG. 1 is a block diagram of a VTR including a special playback apparatus according to an embodiment of the present invention. Two video heads A and B are mounted on rotary drum 11 at equal angular intervals of about 180 degrees. Magnets M1 and M2 are mounted at predetermined positions of drum 11 to detect the angular positions of heads A and B. RF video signals reproduced by heads A and B are extracted from drum 11 respectively through rotary transformers 12a and 12b. Outputs from transformers 12a and 12b are respectively supplied to preamplifiers 13a and 13b. Outputs from preamplifiers 13a and 13b are alternately selected by switch circuit 14 in units of fields, and the selected signal is converted into continuous RF signal PB.

Alternate switching by switch circuit 14 in units of fields is performed in response to head switching pulse E15 from switching pulse generator 15. Generator 15 shapes pulses EGP detected by rotational phase detection head PG which is arranged opposite magnets M1 and M2. The shaped pulses appear as rectangular switching pulse E15 (having a frequency of 30 Hz in the NTSC system).

RF output PB from switch circuit 14 is supplied to video signal processor 16. A luminance signal (Y signal) in the RF output PB is FM-modulated. A low-frequency-converted chroma signal (C signal) is frequency-converted to a C signal having a normal color subcarrier frequency (3.58 MHz in the NTSC system) according to reference signal E42A which has the color subcarrier frequency and supplied from quartz oscillator 42. The processed Y and C signals are converted into a composite video signal in processor 16.

The composite video signal as playback video signal E16 is supplied to analog/digital converter (A/D converter) 17. In this case, signal E16 is sampled by pulses having a frequency of 3 fsc (where fsc is a color subcarrier frequency) phase-locked with a color burst signal and is converted to digital signal E17. Output E17 from A/D converter 17 is converted by serial/parallel converter (S/P converter) 18 into a parallel signal in units of three sampled values, and converted output E18 is written in memory 19. S/P converter 18 is also driven in response to 3-fsc signal phase-locked with the color burst signal.

In the write mode wherein write control signal E20 from timing signal generator 20 appears (E20=L level in FIG. 2C), address data E21 from address generator 21 accesses the corresponding address of memory 19. Generator 21 is cleared in response to signal Ref2 having a frame frequency (30 Hz). Signal Ref2 is obtained such that output E42B from quartz oscillator 42 is divided by frequency divider 22 at a division ratio of, e.g., 1/59719, and that 1/59719 frequency-divided signal Ref1 is further divided by frequency divider 23 at a division ratio of ½. Upon clearing, generator 21 generates data E21 for accessing address 0 of memory 19.

Address generator 21 also receives pulses of frequency fsc as address clocks phase-locked with the color burst signal of signal E18 so that the address is sequentially incremented. If incremented address X corresponding to the lapse of a one-field period is accessed by generator 21, it generates signal (FIG. 2H) for clearing itself so that address 0 is then accessed again.

As a result, digital video signals (E19 in FIG. 2I) corresponding to the contents (A0, A1, A2, ...) of signal PB obtained in the write mode designated by signal E20 are written at addresses 0 to X of memory 19.

In the read mode (E20=H level in FIG. 2C) of image memory 19, memory 19 is sequentially addressed by address generator 21. Parallel digital video signal E19 read out from memory 19 is converted to serial digital video signal E24 by parallel/serial converter (P/S converter) 24 again. Signal E24 is converted into analog video signal E25 by D/A converter 25, and signal E25 appears at output terminal 26. In the read mode, the signal of frequency fsc is supplied as address clocks to generator 21. A 3-fsc signal phase-locked with the address clocks is supplied to P/S and D/A converters 24 and 25 which then perform predetermined operations.

The servo system in the playback mode is arranged as follows. Switch 38 is set at P contact side, and the phase of signal E39 obtained by delaying 60-Hz (field frequency) reference signal Ref1 from divider 22 for a predetermined delay time by delay circuit 39 is compared by phase comparator 40 with that of head switching pulses E15 generated by switching pulse generator 15. Video heads A and B are controlled by an APC loop for controlling drum motor 41 in response to comparison output E40 such that drum 11 carrying video heads A and B thereon is rotated and phase-locked with the reference signal.

Capstan 28 for driving magnetic tape T is driven by capstan motor 29 controlled by an AFC loop (29-FG-30-31-32-29) and an APC loop (29-28-CH-36-32-29), and phase-locked with respect to rotation of video heads A and B.

Output pulse EFG from frequency generator FG for detecting rotation of capstan motor 29 in the AFC loop is 1/M divided by 1/M frequency divider 30. Frequency-divided output E30 is supplied to speed comparator 31. Comparator 31 detects a deviation of the output E30 from a reference frequency (not shown). Deviation or error signal E31 is output to adder 32. In the APC loop, the phase of signal ECH obtained by reproducing the control signal by control head CH from magnetic tape T is compared by phase comparator 36 with signal E35 obtained such that signal Ref2 supplied as the reference signal from ½ frequency divider 23 is 1/M divided by divider 33 and then delayed by a predetermined delay time by tracking control delay circuits (monostable multivibrators) 34 and 35.

Output E36 from comparator 36 is supplied to adder 32. Adder 32 adds AFC and APC control signals E31 and E36 to produce signal E32. Signal E32 is supplied to capstan motor 29. The frequency is controlled such that capstan 28 is rotated at a predetermined speed. The phase of reference signal Ref1 also used in the drum servo system is controlled to coincide with that of playback control signal ECH, thereby performing tracking servo control. Variable resistor VR34 in delay circuit 34 is used to preset tracking. Variable resistor VR35 in delay circuit 35 is used as a manual tracking control resistor.

With the above arrangement, assume that slow playback rate M is given as 4, i.e., assume that ¼ slow playback image is obtained.

In this case, playback RF signal PB having a maximum level is theoretically obtained for every 2M (=8 fields). In other words, fields (A1 and A2 in FIG. 2B) providing the maximum level are present so that they are extracted and stored in memory 19. The operation for selecting the fields (A1 and A2) having a maximum level will be described with reference to FIG. 2.

Figure 2A:
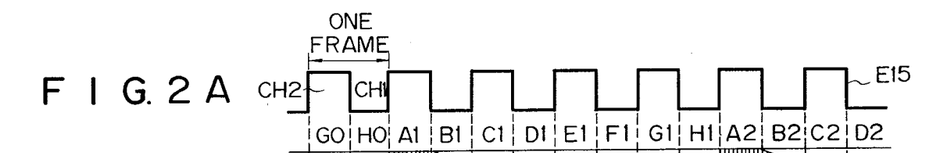
FIGS. 2A to 2S are timing charts for explaining the operation of the special playback apparatus in FIG. 1.
Figure 2B:
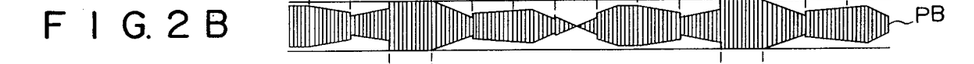
Figure 2C:
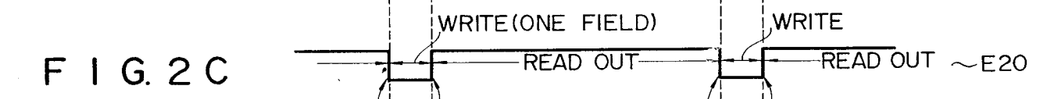
Figure 2D:
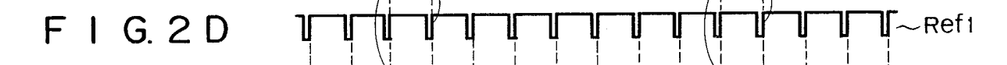
Figure 2E:
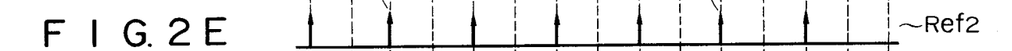
Figure 2F:
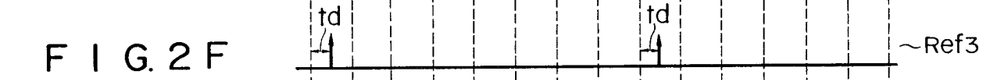

The envelope of RF signal PB at the input terminal of video signal processor 16 is illustrated in FIG. 2B. Output Ref1 as the reference signal from frequency divider 22 is shown in FIG. 2D. An output obtained by ½ dividing the frequency of signal Ref1 is given as external address clear signal Ref2 of address generator 21, as shown in FIG. 2E. An internal address clear signal in FIG. 2H is a signal generated an one-field period after signal Ref2 is generated. Ref3 in FIG. 2F is a capstan system control reference signal obtained such that external address clear signal Ref2 is ¼ (=1/M) divided by frequency divider 33, and that the ¼ frequency-divided signal is delayed by a predetermined delay time (td) by delay circuit 34.

Figure 2G:
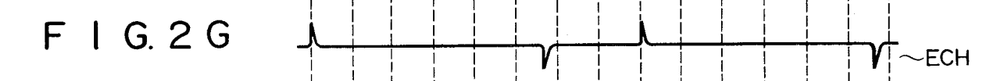
Figure 2H:
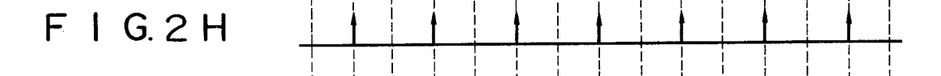
Figure 2I:
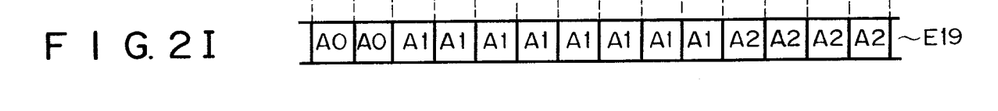

The period of playback control pulse ECH is four times that of signal Ref2 (FIG. 2E) in ¼ slow playback, as shown in FIG. 2G. Therefore, the positive polarity component of pulse ECH has the same period as that of signal Ref3 obtained by ¼ frequency-dividing signal Ref2 but has a predetermined phase difference (td) therefrom. The write start timing of memory 19 is synchronized with external address clear signal Ref2.

Since drum servo reference signal Ref1 is delayed by a predetermined delay time by delay circuit 39, the leading timing of head switching pulse E15 (FIG. 2A) is deviated from that of signal Ref2 by a predetermined time difference. The phase of the generation timing of signal Ref2 is of course shifted from that of playback RF video signals PB. The generation timing is controlled to fall in the vertical flyback period. Switch 38 selects the vertical sync signal as the reference signal supplied to phase comparator 40 in the recording mode (R). However, switch 38 selects output E39 from delay circuit 39 in the playback mode (P).

The delay time of delay circuit 34 is controlled by resistor VR34 to specify a field position for playback signal PB (FIG. 2B) of a maximum level according to the phase relationship between signal Ref3 (FIG. 2F) and external address clear signal Ref2 (FIG. 2E). As shown in FIGS. 2E and 2F, the timings at which the first external address clear signals Ref2 are generated upon generation of signals Ref3 are specified as the start times of the fields (A1 and A2) for respectively providing playback signals PB (FIG. 2B) of a maximum level, as shown in FIGS. 2E and 2F.

It should be noted that once the delay time (i.e., the adjustment point of VR34) of delay circuit 34 is predetermined, it is not changed.

In order to change the speed of tape T to obtain, e.g., a ¼ slow playback image, the generation timing of external address clear signal Ref2 for obtaining playback RF signal PB of a maximum level is naturally shifted. However, the shifting amount can be determined in advance in the design process. It can be also determined which (Nth) external address clear signal Ref2 upon generation of signal Ref3 corresponds to the write start timing of memory 19.

The way of determining the generation timing of signal Ref2 will be described with reference to FIGS. 2J to 2S, mainly exemplifying the case wherein M=4.

Figure 2J:
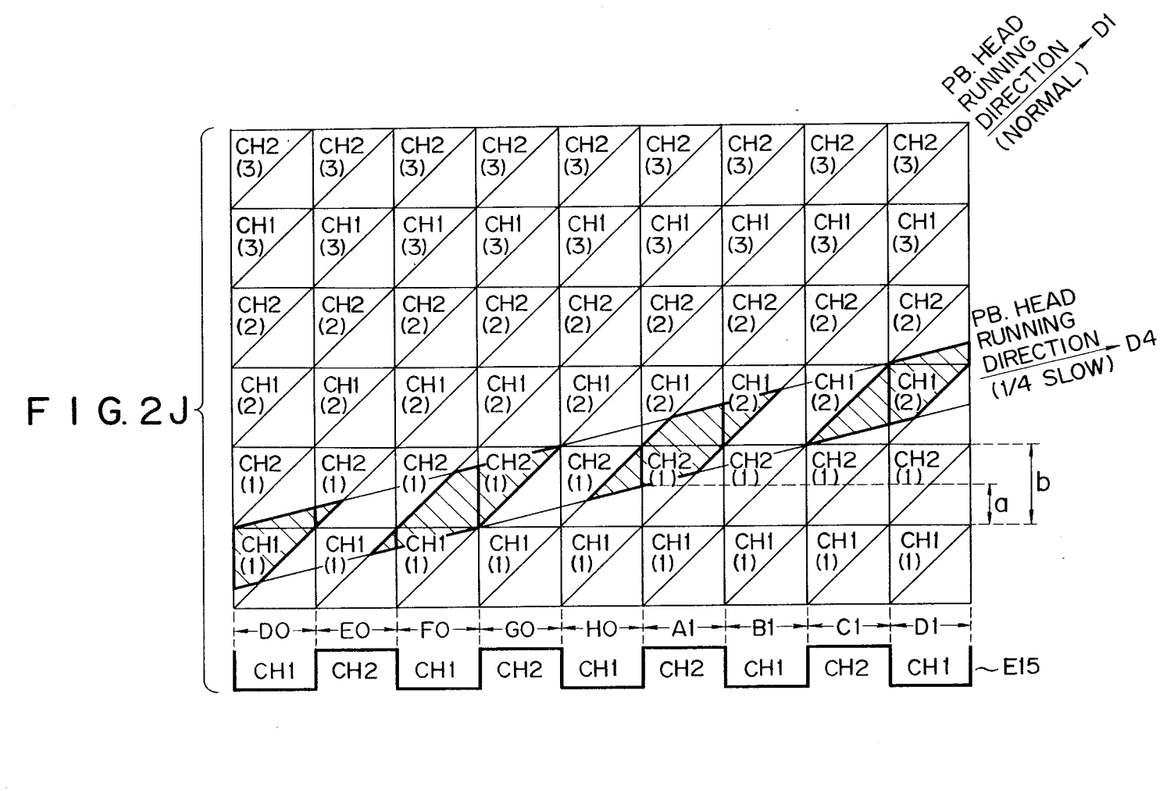
Figure 2K:
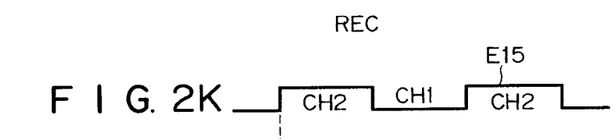
Figure 2L:
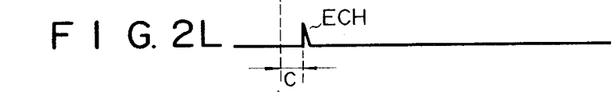

A phase difference between head switching pulse E15 and control pulse ECH in the VTR recording mode is shown in FIGS. 2K and 2L. In this case, the phase difference between E15 and ECH is assumed to be c msec (therefore, the phases difference between E15 and ECH is c msec in the normal playback mode (M=1)).

Figure 2M:
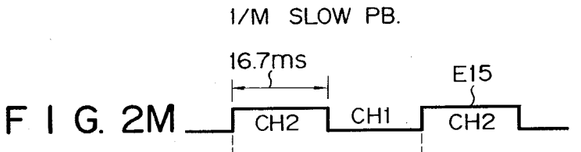
Figure 2N:
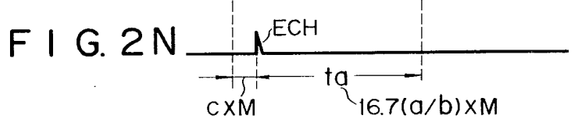
Figure 2O:
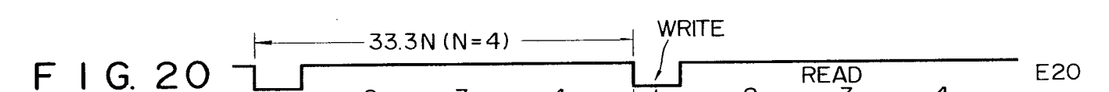
Figures 2P, 2Q:
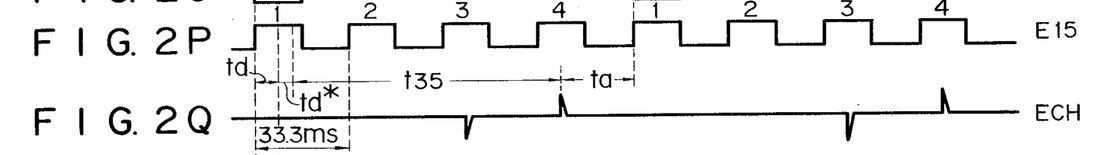
Figure 2R:
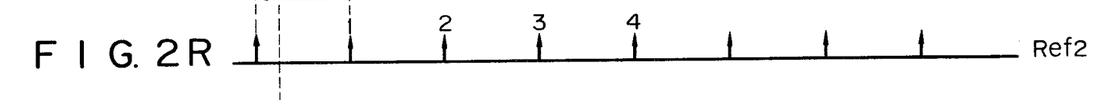

The relationship between pulses E15 and ECH in the 1/M (M≧2) slow playback mode is shown in FIGS. 2M and 2N. If a VTR of interest is an NTSC system VHS VCR (Video Cassette Recorder), a one-field length (measured as time) is about 16.7 msec, and thus a one-frame length is about 33.3 msec. In the 1/M slow playback mode, the phase difference between E15 and ECH is increased to c×M (FIG. 2N). Time ta corresponding to the phase difference between ECH and the second E15 is 16.7(a/b)×M. The calculation process for ta=16.7(a/b)×M will be described with reference to FIG. 2J.

FIG. 2J shows a 3-frame video track pattern, tracing direction D1 of heads A and B in the normal playback mode (M=1), and tracing direction D4 of heads A and B in the 174 slow playback mode (M=4). Reference numerals (1) to (3) in FIG. 2J denote a three-frame virtual data string along the tape travel direction.

Referring to FIG. 2J, CH1 represents an odd field recorded with head A, and CH2 represents an even field recorded with head B. Head switching pulse E15 in FIG. 2J corresponds to pulse E15 in FIG. 2A.

Referring to FIG. 2J, hatched regions are field playback portions when ¼ slow playback is performed with a video head having the same width as that of the recording track. The area of the hatched portions corresponds to the envelope amplitude of playback RF video signal PB. FIG. 2J shows that the maximum area portion (i.e., the maximum amplitude of the PB envelope) is A1 (cf., FIG. 2B). As is apparent from FIG. 2J, the tracking phase of the A1 portion in the 1/M slow playback mode is shifted from the normal playback mode (M=1). If the one-field phase is defined as b, a tracking phase deviation in the slow playback mode from that in the normal playback mode is defined as b, and a one-field time is given as 16.7 msec, the time ta in FIG. 2N is calculated as 16.7(a/b) ' M (a/b can be actually measured according to the type of VTR).

The way of determining the delay time td of signal Ref3 in FIG. 2F with reference to control pulse ECH will be described with reference to FIGS. 20 to 2S.

Figure 2S:
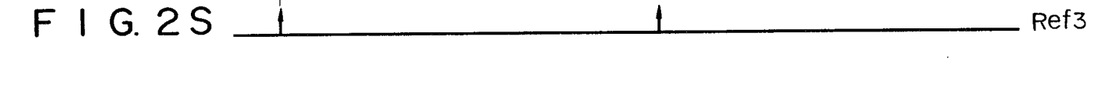

Referring to FIGS. 20 to 2S, ta is the same as ta in FIG. 2N, t35 is a delay time of delay circuit 35, and td* is a time length estimated when the insensitive area or the like is taken into consideration. Time t35 is actually measured according to the type of VTR (VCR) within the range of ±16.7×M (msec) if the one-field length is 16.7 msec and a slow playback rate is M. In this case, if a one-frame length is 33.3 msec and N is a predetermined integer corresponding to the slow playback rate M, td=33.3N−(td*+t35+ta).

The above description has clarified how the phase of head switching pulse E15 is shifted with respect to control pulse ECH and how the phase of signal Ref3 is determined with respect to pulse ECH in the 1/M slow playback mode. By using the specified E15, Ref3, etc., the noiseless field, corresponding to playback RF signal PB with a maximum amplitude, can be always written in memory 19 at any slow playback speed.

The tracking phase shift amount in the slow playback mode is changed according to a change in speed of magnetic tape T to preset the value of N. The value of N is set by microcomputer 37. Number N of external clear pulses Ref2 generated after generation of signal Ref3 until the field for RF playback signal PB having a maximum level is stored in a ROM or the like in microcomputer 37 so as to correspond to a given tape speed (or slow playback rate M). When the tape speed is changed, the generation timing of write control signal E20 is automatically controlled according to a change in tape speed.

Write control signal E20 is generated by timing signal generator 20 and will be described with reference to FIGS. 3 to 5.

Figure 3:
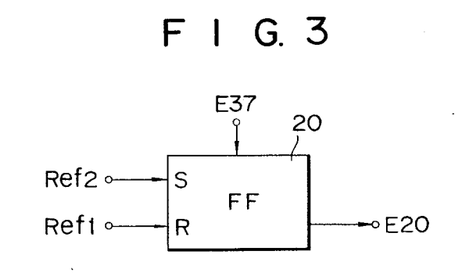
FIG. 3 is a diagram showing timing signal generator 20 in FIG. 1.
Figure 4A:
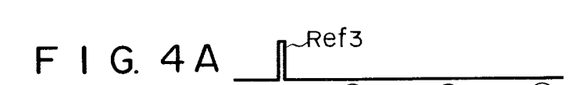
FIGS. 4A to 4E are timing charts for explaining a write timing of image memory 19 in FIG. 1.
Figure 4B:
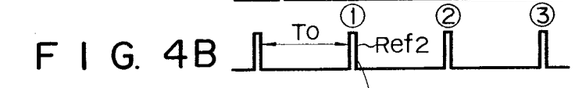
Figures 4C, 4D:
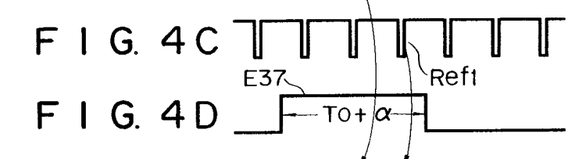
Figure 4E:
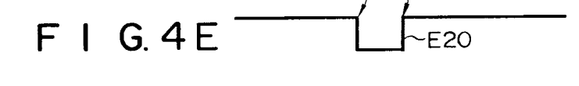
Figure 5A:
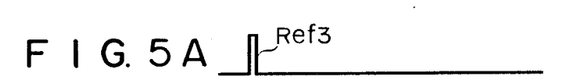
FIGS. 5A to 5E are timing charts for explaining a write timing of image memory 19 in FIG. 19, the timing being different from that in FIGS. 4A to 4E.

Timing signal generator 20 comprises a set enable type RS flip-flop (FIG. 3). External address clear signal Ref2 is supplied to set terminal S of RS flip-flop 20, and signal Ref1 as an output from frequency divider 22 is supplied to reset terminal R thereof. Output signal E37 of microcomputer 37 is supplied as set enable signal to flip-flop 20. If the period of signal Ref2 (FIG. 4B) is given as T0, signal E37 (FIG. 4D) of high level is output as a set enable signal from microcomputer 37 for T0+α period. The generation timing of the high level signal is synchronized with that of Ref3 for N=1 (FIGS. 4A and 4D). The generation timing is set as a timing after generation of the first external address clear signal Ref2 for N=2 (FIGS. 5A and 5D). As a result, write control signal E20 corresponding to the value (1 or 2) of the N is obtained. The generation period of signal E20 is just a one-field period. If N>2, then the generation timing of set enable signal E37 is a timing after N-1 address clear pulses Ref2 are counted upon reception of signal Ref3.

Figure 6:
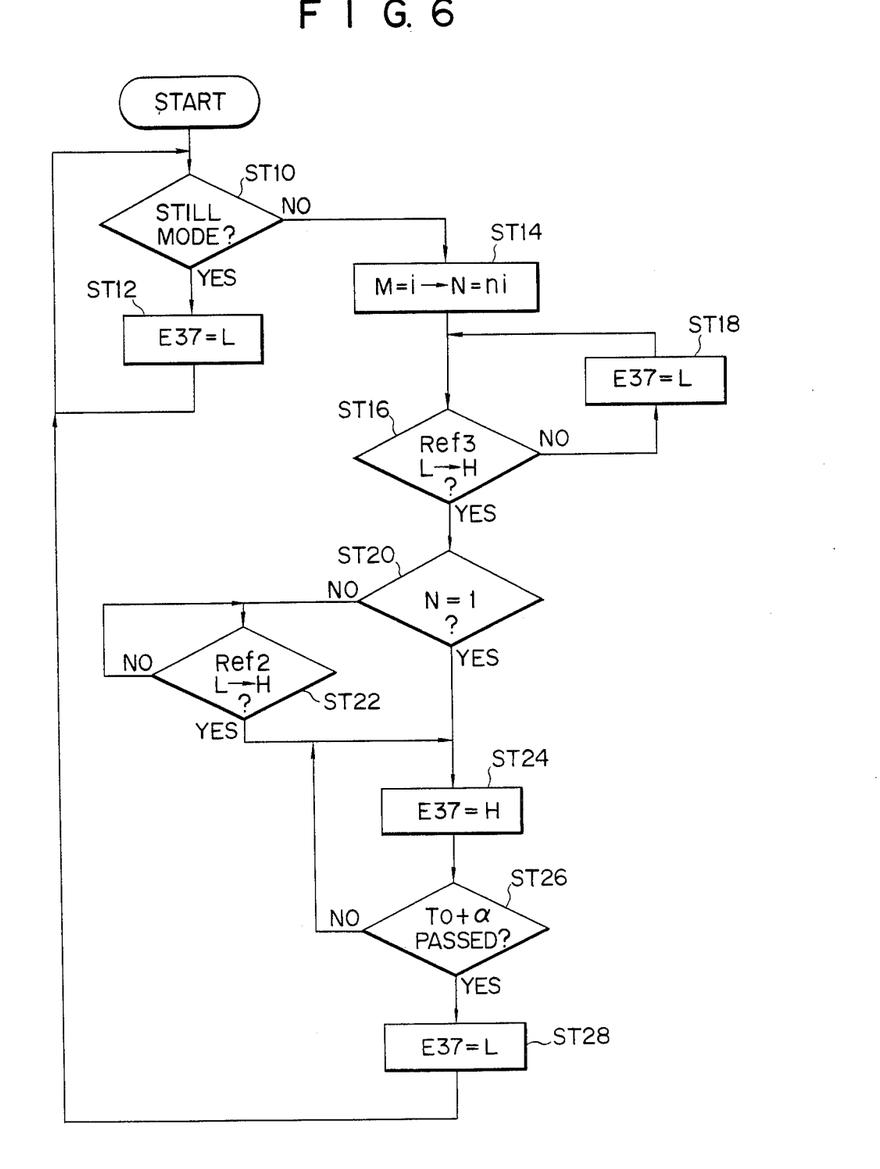
FIG. 6 is a flow chart for explaining the operation of microcomputer 37 in FIG. 1 in a special playback mode.

FIG. 6 is a flow chart for explaining the operation of microcomputer 37 when still playback or 1/M slow playback is performed.

If the mode is changed from the normal playback mode to a still playback mode (ST10, YES), set enable signal E37 goes low (ST12). The setting state of RF flip-flop 20 in FIG. 3 is released, and write control signal E20 (FIGS. 2C, 4E or 5E) goes high so that identical digital still playback video signal E19 (e.g., A1 in FIG. 2I) is repeatedly read out from memory 19. The repeated read operation continues until the still mode is cancelled.

If the mode is changed from the normal or still playback mode to the slow playback mode (ST10, NO), value ni of N, corresponding to value i of slow playback rate M, is set (ST14). For example, if ½ slow (i=2) is set, then N=2. In this state, if signal Ref3 is kept at L level (ST16, NO), signal E37 keeps L level (ST18), and write access of memory 19 is inhibited. E37=L is kept until Ref3 goes high.

If signal Ref3 goes high (ST16, YES), microcomputer 37 determines whether N=1 is established (ST20). In the above case, since N=2 (ST20, NO), signal Ref2 is checked whether it goes high (ST22). This decision block is repeated until Ref2 goes high (ST22, NO).

Figure 5B:
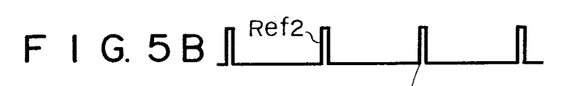
Figures 5C, 5D:
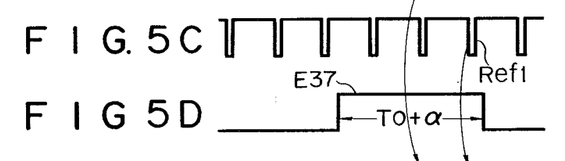
Figure 5E:
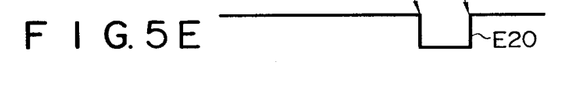

If external clear pulse Ref2 goes high (ST22, YES), set enable signal E37 goes high (ST24) (cf. FIGS. 5B and 5D). After E37=H is established, microcomputer 37 causes a timer counter (not shown) to start so as to determine whether a time T0+α (FIG. 5D) has elapsed (ST26). Within the period of T0+α (step 26, NO), E37=H is maintained (ST24). Within the period for E37=H, the RS flip-flop in FIG. 3 is set in response to Ref2 (FIG. 5B) and reset in response to Ref1 (FIG. 5C), so that signal E20 of low level (FIG. 5E) is generated. Slow playback video data is written in memory 19 in response to E20=L within the period of T0+α.

When data write operation of memory 19 is completed and the period of T0+α has elapsed (ST26 YES), set enable signal E37 goes low again (ST28) and the flow returns to step ST10.

In the normal playback mode (ST10, NO), M=1 and N=1 are established (ST14). In this case, if Ref3 (FIG. 4A) goes high (ST16, YES), E37 (FIG. 4D) goes high since N=1 (ST24). Signal E20 (FIG. 4E) is generated within the period of T0+α (FIG. 4D) so that video data is written in memory 19. After the lapse of the period of T0+α (ST26, YES), E37 goes low again (ST28), and the flow returns to the first step ST10. The flow for N=1 is for writing video data of the normal playback mode in the memory. Therefore, the video signal in the normal playback mode can be converted into a still playback image at any time.

The special playback apparatus according to the present invention can also be applied to a PAL or SECAM type VTR in addition to an NTSC type VTR. The special playback apparatus may also be applicable to a ¾" U-matic VCR and a 1" broadcast VTR, in addition to a VHS or β type ½" VCR.

What is claimed is:

1. A special playback apparatus for a helical scan type VTR, comprising:
   tape travel control means for controlling travelling of a video tape such that a control signal, representing a position of a video track on said video tape, has a predetermined phase difference from a frequency-divided reference signal obtained by 1/M (where M is a natural number of 2 or more) frequency-dividing a predetermined reference signal having a frame frequency;
   rotary head control means for controlling rotation of rotary heads for tracing the video track on said video tape, such that said rotary heads are rotated to have a prescribed phase difference with respect to the predetermined reference signal; and
   memory means, having a memory capacity of at least one field of a video signal, for storing, at 2M fields interval, a one-field component of the video signal reproduced to the predetermined reference signal according to the frequency-divided reference signal.

2. An apparatus according to claim 1, wherein said memory means includes means for generating a write control signal for starting storage of the video signal after a given number of predetermined reference signals are generated upon generation of the frequency-divided signal, the given number corresponding to the M.

3. An apparatus according to claim 2, wherein said memory means further includes field memory means for storing digital image data corresponding to the video signal according to a write address signal, the write address signal being updated in response to the predetermined reference signal.

4. An apparatus according to claim 1, wherein said tape travel control means includes:
   frequency-dividing means for 1/M dividing the predetermined reference signal to provide a frequency-divided signal; and
   phase-shifting means for shifting a phase of the frequency-divided signal by a predetermined shift amount to generate the frequency-divided reference signal, the shift amount being selected such that an amplitude of the video signal stored in said memory means becomes substantially maximum.

5. An apparatus according to claim 2, wherein said tape travel control means includes:
   frequency-dividing means for 1/M dividing the predetermined reference signal to provide a frequency divided signal; and phase-shifting means for shifting a phase of the frequency-divided signal by a predetermined shift amount to generate the frequency-divided reference signal, the shift amount being selected such that an amplitude of the video signal stored in said memory means becomes substantially maximum.

6. An apparatus according to claim 3, wherein said tape travel control means includes:
frequency-dividing means for 1/M dividing the predetermined reference signal to provide a frequency divided signal; and
phase-shifting means for shifting a phase of the frequency-divided signal by a predetermined shift amount to generate the frequency-divided reference signal, the shift amount being selected such that an amplitude of the video signal stored in said memory means becomes substantially maximum.

7. An apparatus according to claim 2, wherein said write control signal generating means includes:
means for generating a set enable signal for a predetermined period after the given number of the predetermined reference signals are generated; and
means, set in response to the predetermined reference signal and then reset in response to a lapse of a one-field period of the video signal during generation of the set enable signal, for outputting the write control signal.

8. An apparatus according to claim 7, wherein the predetermined period for generating the set enable signal is longer than one period of the predetermined reference signal.

9. An apparatus according to claim 5, wherein said write control signal generating means includes:
means for generating a set enable signal for a predetermined period after the given number of the predetermined reference signals are generated; and
means, set in response to the predetermined reference signal and then reset in response to a lapse of a one-field period of the video signal during generation of the set enable signal, for outputting the write control signal.

10. An apparatus according to claim 9, wherein the predetermined period for generating the set enable signal is longer than one period of the predetermined reference signal.

11. An apparatus according to claim 1, wherein said rotary head control means includes:
means for generating a phase-shifted reference signal which is synchronized with the predetermined reference signal and has a given phase difference with respect to the predetermined reference signal, the given phase difference being selected such that generation of the predetermined reference signal occurs within a vertical flyback period of the video signal; and
means for comparing a phase of a phase signal, representing a rotational phase of said rotary heads, and a phase of the phase-shifted reference signal, and for rotating said rotary heads according to a result of this phase comparison.

12. An apparatus according to claim 2, wherein said rotary head control means includes:
means for generating a phase-shifted reference signal which is synchronized with the predetermined reference signal and has a given phase difference with respect to the predetermined reference signal, the given phase difference being selected such that generation of the predetermined reference signal occurs within a vertical flyback period of the video signal; and
means for comparing a phase of a phase signal, representing a rotational phase of said rotary heads, and a phase of the phase-shifted reference signal, and for rotating said rotary heads according to a result of this phase comparison.

13. An apparatus according to claim 3, wherein said rotary head control means includes:
means for generating a phase-shifted reference signal which is synchronized with the predetermined reference signal and has a given phase difference with respect to the predetermined reference signal, the given phase difference being selected such that generation of the predetermined reference signal occurs within a vertical flyback period of the video signal; and
means for comparing a phase of a phase signal, representing a rotational phase of said rotary heads, and a phase of the phase-shifted reference signal, and for rotating said rotary heads according to a result of this phase comparison.

14. An apparatus according to claim 4, wherein said rotary head control means includes:
means for generating a phase-shifted reference signal which is synchronized with the predetermined reference signal and has a given phase difference with respect to the predetermined reference signal, the given phase difference being selected such that generation of the predetermined reference signal occurs within a vertical flyback period of the video signal; and
means for comparing a phase of a phase signal, representing a rotational phase of said rotary heads, and a phase of the phase-shifted reference signal, and for rotating said rotary heads according to a result of this phase comparison.

15. An apparatus according to claim 5, wherein said rotary head control means includes:
means for generating a phase-shifted reference signal which is synchronized with the predetermined reference signal and has a given phase difference with respect to the predetermined reference signal, the given phase difference being selected such that generation of the predetermined reference signal occurs within a vertical flyback period of the video signal; and
means for comparing a phase of a phase signal, representing a rotational phase of said rotary heads, and a phase of the phase-shifted reference signal, and for rotating said rotary heads according to a result of this phase comparison.

16. An apparatus according to claim 6, wherein said rotary head control means includes:
means for generating a phase-shifted reference signal which is synchronized with the predetermined reference signal and has a given phase difference with respect to the predetermined reference signal, the given phase difference being selected such that generation of the predetermined reference signal occurs within a vertical flyback period of the video signal; and
means for comparing a phase of a phase signal, representing a rotational phase of said rotary heads, and a phase of the phase-shifted reference signal, and for rotating said rotary heads according to a result of this phase comparison.

17. An apparatus according to claim 7, wherein said rotary head control means includes:
  means for generating a phase-shifted reference signal which is synchronized with the predetermined reference signal and has a given phase difference with respect to the predetermined reference signal, the given phase difference being selected such that generation of the predetermined reference signal occurs within a vertical flyback period of the video signal; and
  means for comparing a phase of a phase signal, representing a rotational phase of said rotary heads, and a phase of the phase-shifted reference signal, and for rotating said rotary heads according to a result of this phase comparison.

18. An apparatus according to claim 8, wherein said rotary head control means includes:
  means for generating a phase-shifted reference signal which is synchronized with the predetermined reference signal and has a given phase difference with respect to the predetermined reference signal, the given phase difference being selected such that generation of the predetermined reference signal occurs within a vertical flyback period of the video signal; and
  means for comparing a phase of a phase signal, representing a rotational phase of said rotary heads, and a phase of the phase-shifted reference signal, and for rotating said rotary heads according to a result of this phase comparison.

19. A special playback apparatus comprising:
  means for controlling a magnetic tape to travel at a constant speed of 1/M (where M is an integer of 2 or more) that of a normal playback mode, said magnetic tape being driven at a predetermined speed, being provided with video tracks alternately formed with helical scanning by two video heads, and being recorded with a control signal representing a position of each video track, and for controlling to establish a predetermined phase relationship between the playback control signal and a 1/M frequency-divided signal obtained by 1/M frequency-dividing a tape drive servo system reference signal in the normal playback mode;
  means for controlling the rotation of said video heads, so that the rotational phase of said video heads has a given phase relationship with the tape drive servo system reference signal;
  means for writing a video signal, reproduced from said video heads, in an image memory, having a memory capacity of at least one field of the video signal, at 2M fields interval, one-field component of the video signal being written in said memory in response to the tape drive servo system reference signal, which is phase-locked with rotation of said video heads, after a predetermined number of the tape drive servo system reference signals are generated upon generation of the 1/M frequency-divided signal; and
  means for outputting, as special playback video signals, both the video signal to be written in said memory and a video signal read out from said memory.

20. An apparatus according to claim 19, wherein the number of the tape drive servo system reference signals generated prior to write access of said memory upon generation of the 1/M frequency-divided signal is determined to be based on a value of the M.

21. A slow-playback apparatus for a helical scanning type VCR in which a video signal is continuously recorded on a video tape by rotary heads to form a plurality of slanted recording tracks such that each of the recording tracks contains one field of the video signal, wherein a control signal having a frame frequency and indicating respective recording position of the recording tracks on the video tape is recorded on the video tape, said slow-playback apparatus comprising:
  tape travel control means for controlling the traveling of the video tape, such that a frequency-divided reference signal, obtained by 1/M frequency-dividing a reference signal having said frame frequency, has a predetermined phase difference from said control signal, said M indicating a natural number of more than one;
  rotary head control means for controlling the rotation of said rotary heads such that the rotary head rotation has a predetermined phase relation with respect to said frame frequency reference signal;
  reproducing means, coupled to said rotary heads, for reproducing the video signal from said video tape;
  a memory having a memory capacity of at least one field of said video signal;
  memory control means, for writing into said memory, at 2M fields interval, said video signal of one field reproduced by said reproducing means, and continuously reading out the stored one field video signal from said memory to provide a read out video signal during periods other than the period of writing said video signal, an amplitude of the reproduced video signal from said reproducing means, obtained at said 2M fields interval, being substantially larges among those obtained during periods other than said 2M fields interval, wherein the writing of said video signal begins in response to the Nth generation of said frame frequency reference signal, after the generation of said frequency-divided reference signal, N indicating a natural number; and
  means for obtaining a slow reproduced video signal from a combination of the video signals to be written into said memory and the read out video signal from said memory.

* * * * *